United States Patent [19]

Chen et al.

[11] Patent Number: 5,347,392

[45] Date of Patent: Sep. 13, 1994

[54] ELECTRIC-OPTIC RESONANT PHASE MODULATOR

[75] Inventors: Chien-Chung Chen, San Gabariel; Deborah L. Robinson, Scotts Valley; Hamid Hemmati, Encino, all of Calif.

[73] Assignee: The United States of America as represented by the Administrator of the National Aeronautics and Space Administration, Washington, D.C.

[21] Appl. No.: 842,300

[22] Filed: Feb. 26, 1992

[51] Int. Cl.⁵ .................. G03H 1/02; G08B 5/23; H01S 3/10

[52] U.S. Cl. .................. 359/279; 359/183; 372/18; 372/95

[58] Field of Search .............. 359/183, 191, 239, 261, 359/279, 317; 385/3; 372/18, 95

[56] References Cited

U.S. PATENT DOCUMENTS

| | | | |
|---|---|---|---|
| 2,385,085 | 9/1945 | Labin | 359/183 |
| 3,512,870 | 5/1970 | Wilson et al. | 359/279 |
| 4,289,403 | 9/1981 | Allington | 356/349 |
| 4,742,576 | 5/1988 | McMahon | 359/183 |
| 4,925,302 | 5/1990 | Cutler | 356/128 |
| 4,998,255 | 3/1991 | Gerstenberger et al. | 372/28 |

OTHER PUBLICATIONS

Travelling-Wave Electrooptic Modulator by C. M. Gee, G. D. Thurmond and H. W. Yen, Appl. Opt., vol. 22, No. 13, pp. 2034–2037, Jul. 1983.

Thin–Film LiNbO₃ Electro–Optic Light Modulator by I. P. Kaminow, J. R. Carruthers, E. H. Turner and L. W. Stulz, Appl. Phys. Lett., vol. 22, No. 10, pp. 540–542, May 1973.

Resonant Cavity Sensor for Integrated Optics by R. R. A. Syms, IEEE Journal Of Quantum Electronics, vol. QE-21, No. 4, Apr. 1985.

Resonant Modulation by W. J. Stewart, I. Bennion and M. J. Goodwin, Phil. Trans. R. Soc. Lond. A313, p. 401, 1984.

Electro–Optic Resonant Waveguide Modulation by W. J. Stewart, I. Bennion and M. J. Goodwin, Tenth European Conference On Optical Communication, Sep. 1984.

(List continued on next page.)

Primary Examiner—Nelson Moskowitz
Attorney, Agent, or Firm—John H. Kusmiss; Thomas H. Jones; Guy M. Miller

[57] ABSTRACT

An electro-optic resonant cavity is used to achieve phase modulation with lower driving voltages. Laser damage thresholds are inherently higher than with previously used integrated optics due to the utilization of bulk optics. Phase modulation is achieved at higher speeds with lower driving voltages than previously obtained with non-resonant electro-optic phase modulators. The instant scheme uses a data locking dither approach as opposed to the conventional sinusoidal locking schemes. In accordance with a disclosed embodiment, a resonant cavity modulator has been designed to operate at a data rate in excess of 100 Mbps. By carefully choosing the cavity finesse and its dimension, it is possible to control the pulse switching time to within 4 ns and to limit the required switching voltage to within 10 V. Experimentally, the resonant cavity can be maintained on resonance with respect to the input laser signal by monitoring the fluctuation of output intensity as the cavity is switched. This cavity locking scheme can be applied by using only the random data sequence, and without the need of additional dithering of the cavity. Compared to waveguide modulators, the resonant cavity has a comparable modulating voltage requirement. Because of its bulk geometry, resonant cavity modulator has the potential of accommodating higher throughput power. Furthermore, mode matching into a bulk device is easier and typically can be achieved with higher efficiency. On the other hand, unlike waveguide modulators which are essentially traveling wave devices, the resonant cavity modulator requires that the cavity be maintained in resonance with respect to the incoming laser signal. An additional control loop is incorporated into the modulator to maintain the cavity on resonance.

16 Claims, 8 Drawing Sheets

OTHER PUBLICATIONS

Design, Construction, and Analysis of an Ultra-Low Expansion Quartz Resonant Cavity Passive Ring Resonator Laser Gyroscope by K. A. Pugh, Master Of Science Thesis, Air Force Institute of Technology Air University, Mar. 1982.

Coherent Communication Link Using Diode-Pumped Lasers by T. J. Kane and R. W. Wallace, Final Report For Contract NAS5-30487 for NASA Goddard Space Flight Center, Aug. 1989.

Optical Waves in Crystals by A. Yariv, John Wiley and Sons, Inc., New York, 1984.

An Interferometer Useful for Pulse Compression of a Frequency Modulated Light Source by F. Gires and P. Tournois, C.R. Acad. Sci., vol. 258, p. 6112, 1964.

Laser Frequency Stabilization by Polarization Spectroscopy of a Reflecting Reference Cavity by T. W. Hansch and B. Couillaud, Optical Communications, vol. 35, No. 3, Dec. 1980.

Laser Phase and Frequency Stabilization Using an Optical Resonator by R. W. P. Drever, J. L. Hall, F. V. Kowalski, J. Hough, G. M. Ford, A. J. Munley and H. Ward, Appl. Physl B, vol. 31, pp. 97–105, 1983.

Principles of Resonant Cavity Optical Modulator by T. F. Gallagher, N. H. Tran and J. P. Watjen, Appl. Opt., vol. 25, No. 4, pp. 510–514, Feb. 1986.

Broadband Optical Coupling Modulation by F. R. Nash and P. W. Smith, IEEE J. Quantum Electron., vol. AE-4, pp. 26–34, 1968.

Optical Coupling Modulation in Travelling-Wave Cavities by D. M. Henderson and V. A. Vilnrotter, Appl. Phys. Lett., vol. 30, No. 7, pp. 335–337, Apr. 1977.

Robinson et al; Proc. SPIE, Free Space Laser Comm. Tech. III; L.A., Calif., Jan. 21–22, 1991; vol. 1417, pp. 421–430.

Robinson, D. L.; Telecomm. and Data Acquis. Report, pp. 240–247, NTIS N 89-27871/7; abst. only provided herewith.

Robinson et al; Opt Eng., vol. 32, #3, pp. 458–463, Mar. 1993; abst only provided herewith.

Chen et al; Proc. SPIE, vol. 1635, pp. 135–143, 1992 abst only provided herewith.

ELECTRIC-OPTIC RESONANT PHASE MODULATOR

ORIGIN OF INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates generally to coherent optical communications and more specifically to coherent phase modulated optical communications wherein a high data rate resonant phase modulator operates with low driving voltages.

BACKGROUND ART

Coherent optical communication technology can provide improved receiver sensitivity compared to direct detection systems in many applications. By amplifying the weak incident signal with a strong local oscillator (LO) output, the system can overcome thermal noise limitations and achieve near quantum-limited sensitivity. In addition, coherent reception offers a better background noise rejection capability since the spectral filtering is performed at the intermediate frequency where the bandwidth can be much more selective. The bandwidth selective nature of the coherent receiver can also lead to a more efficient use of the optical spectrum and the potential of multiple-access communications over a single lasing bandwidth.

In order to realize the full benefits of the coherent system, it is desirable that the transmitted optical signal be phase encoded. Phase encoding provides optimal energy efficiency, and is particularly desirable for deep-space missions where the signal power is at a premium. At the receiving end, the optical signal is coherently detected by spatially mixing the incoming signal with a local oscillator laser output and then detecting it using a balanced detector receiver. Phase modulation of semiconductor lasers can be accomplished by modulating the injection current density and hence the instantaneous frequency of the laser. For CW lasers such as diode pumped solid state lasers an external modulator will be required. Bulk electro-optical (EO) phase modulation often requires high modulation voltage that is not practical to achieve in a flight system. Several approaches can be used to lower the driving voltage requirement. The techniques include travelling wave modulators with long interaction lengths and waveguide modulators with narrow channels (C. M. Gee, G. D. Thurmond and H. W. Yen, "Travelling-Wave Electro-Optic Modulator", Appl. Opt., Vol. 22, No. 13, pp. 2034–2037, July, 1983; I. P. Kaminow, J. R. Carruthers, E. H. Turner, and L. W. Stulz, "Thin-Film LiNbO$_3$ Electro-Optic Light Modulator", Appl. Phys. Lett., Vol. 22, No. 10, pp. 540–542, May, 1973). Resonant modulators in which the optical and RF modulation signals are both resonated to improve the modulation efficiency have also been proposed and implemented (T. F. Gallagher, N. H. Tran and J. P. Watjen, "Principles of Resonant Cavity Optical Modulator", Appl. Opt., Vol. 25, No. 4, pp. 510–514, Feb. 1986; W. J. Stewart, I. Bennion and M. J. Goodwin, "Electro-Optic Resonant Waveguide Modulation", Tenth European Conference On Optical Communication, Sept. 1984). In order to match the group velocity of optical and RF signals, however, these devices tend to have a narrow modulation bandwidth and cannot be extended to broadband operation needed for data modulation. An alternative is to use only a resonant optical cavity which enhances the interaction length without complex electrode configuration to match the optical and electronic group velocity (W. J. Stewart, I. Bennion and M. J. Goodwin, "Resonant Modulation", Phil. Trans. R. Soc. Lond. A313, p. 401, 1984). Since no electrical resonator is used, the method can in principle be operated at near demodulation frequency. The upper limit of modulation bandwidth is limited by the finesse and hence the cavity lifetime. A resonant ring cavity using this principle has been under investigation for coherent communication (T. J. Kane and R. W. Wallace, "Coherent Communication Link Using Diode-Pumped Lasers", Final Report for Contract NAS5-30487 for NASA Goddard Space Flight Center, August 1989). The present invention relates to an electro-optic resonant phase modulator which as been designed to operate at 100 Mbps. Previously, resonant cavities have also been explored for amplitude modulation (F. R. Nash and P. W. Smith, "Broadband Optical Coupling Modulation", IEEE J. Quantum Electron, Vol. QE-4, pp. 26–34, 1968; D. M. Henderson an V. A. Vilnrotter, "Optical Coupling Modulation In Travelling-Wave Cavities", Appl. Phys. Lett., Vol. 30, No. 7, pp. 335–337, April 1977). The concept of resonant cavity has also been extended to temperature sensors and high-speed signal processing (R.R.A. Syms, "Resonant Cavity Sensor for Integrated Optics", IEEE Journal of Quantum Electronics, Vol QE-21, No. 4, April, 1985) and a passive resonant ring cavity laser gyroscope has been investigated as an alternative to the standard Sagnac interferometer laser gyroscope (K. A. Pugh, "Design, Construction, and Analysis of An Ultra-Low Expansion Quartz Resonant Cavity Passive Ring Resonator Laser Gyroscope", Master of Science Thesis, Air Force Institute of Technology Air University, March 1982).

STATEMENT OF THE INVENTION

A resonant cavity electro-optic phase modulator has been designed and implemented to operate at a data rate of 100 Mbps. The modulator consists of an electro-optic crystal located in a highly resonant cavity. The cavity is electro-optically tuned on and off resonance, and the phase dispersion near the cavity resonance provides the output phase modulation. The performance of the modulator was measured by first heterodyne detecting the signal to an intermediate frequency and then measuring the spectral characteristics using an RF spectrum analyzer. The measured phase shift is shown to be in good agreement with the theoretical predictions.

OBJECTS OF THE INVENTION

It is therefore a principal object of the present invention to provide an electro-optic resonant phase modulator wherein phase modulation is achieved with reduced driving voltages.

It is an additional object of the invention to provide an electro-optic resonant phase modulator wherein a phase modulation data rate of 100 Mbps is provided with switching voltages less than 10 Volts.

It is still an additional object of the invention to provide an external cavity phase modulator for electro-optics communication and employing a voltage switched electro-optic crystal for detuning the cavity from resonance at a high data rate using relatively low voltage.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 8, comprising FIGS. 8(a), 8(b), 8(c) and 8(d), is a graphical illustration of the periodic modulation signal of FIG. 8(a), wherein FIG. 8(b) shows the resulting output intensity for a cavity biased on resonance and FIGS. 8(c) and 8(d) illustrate output intensity when the cavity is biased off resonance;

FIG. 11, comprising

DETAILED DESCRIPTION OF A PREFERRED EMBODIMENT

The phase modulator of the invention is an external cavity phase modulator in which an optical cavity is biased near resonance to the incident laser beam. Since the phase angle of the reflected signal from a tuned cavity is highly dispersive near the resonance, a small detuning of the cavity from resonance can result in a large output phase shift. By modulating the cavity near its resonance, therefore, the output phase can be modulated.

Figure 1:
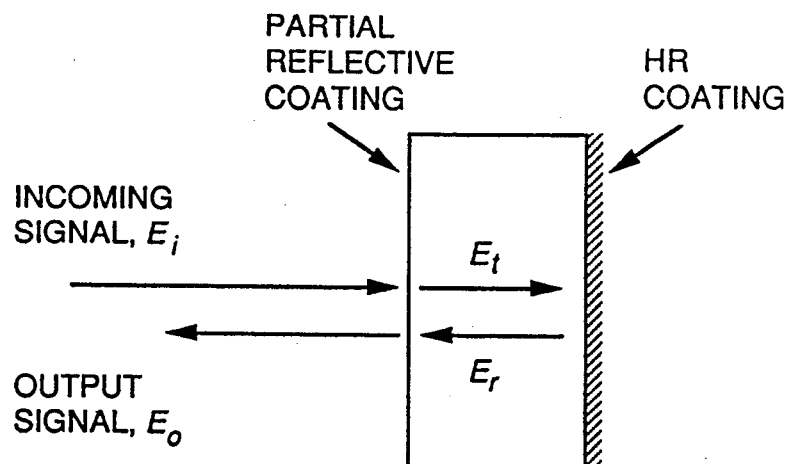
FIG. 1 is a conceptual illustration of a Gire-Turnois etalon which is a prior art realization of a resonant cavity.

A particular realization of the resonant cavity is the Gire-Turnois etalon shown in FIG. 1. The etalon consists of a partially reflective input coupler with reflectivity R and a highly reflective back mirror. The incoming signal $E_i$, the reflected signal, $E_o$ satisfy the following relationship:

$$\begin{pmatrix} E_t \\ E_r \end{pmatrix} = \begin{pmatrix} t & r \\ -r^* & t^* \end{pmatrix} \cdot \begin{pmatrix} E_i \\ E_t \end{pmatrix}, \quad (1)$$

were $|t|^2 = t$ and $|r|^2 = R$ are the transmittance and reflectivity of the input coupler, and $E_t$, $E_r$ are the transmitted amplitude into the etalon, and the reflected signal from the back surface, respectively. $T + R = 1$ by conservation of energy. Without loss of generality, both r and t can be chosen as real numbers. A round trip within the cavity will pick up an equivalent phase shift $\phi$ and an amplitude gain g such that $$E_r = g e^{i\phi} \cdot E_t. \quad (2)$$

Equations (1) and (2) can be solved for the relationship between input and output fields. The result is $$E_o = \left[ \frac{g e^{i\phi} - r^*}{1 - r g e^{i\phi}} \right] E_i. \quad (3)$$

The output intensity and phase shift, $\Phi$, can be solved from Equation (3) as $$I_o/I_i = \frac{G + R - 2\sqrt{GR} \cos\phi}{1 + GR - 2\sqrt{GR} \cos\phi}. \quad (4)$$

$$\Phi = \tan^{-1}\left[ \frac{\sqrt{G}(1-R)\sin\phi}{-\sqrt{R}(1+G) + \sqrt{G}(1+R)\cos\phi} \right], \quad (5)$$

where $G = |g|^2$ is the effective gain of the cavity. $G \leq 1$ for a passive cavity shown in FIG. 1.

Figure 2:
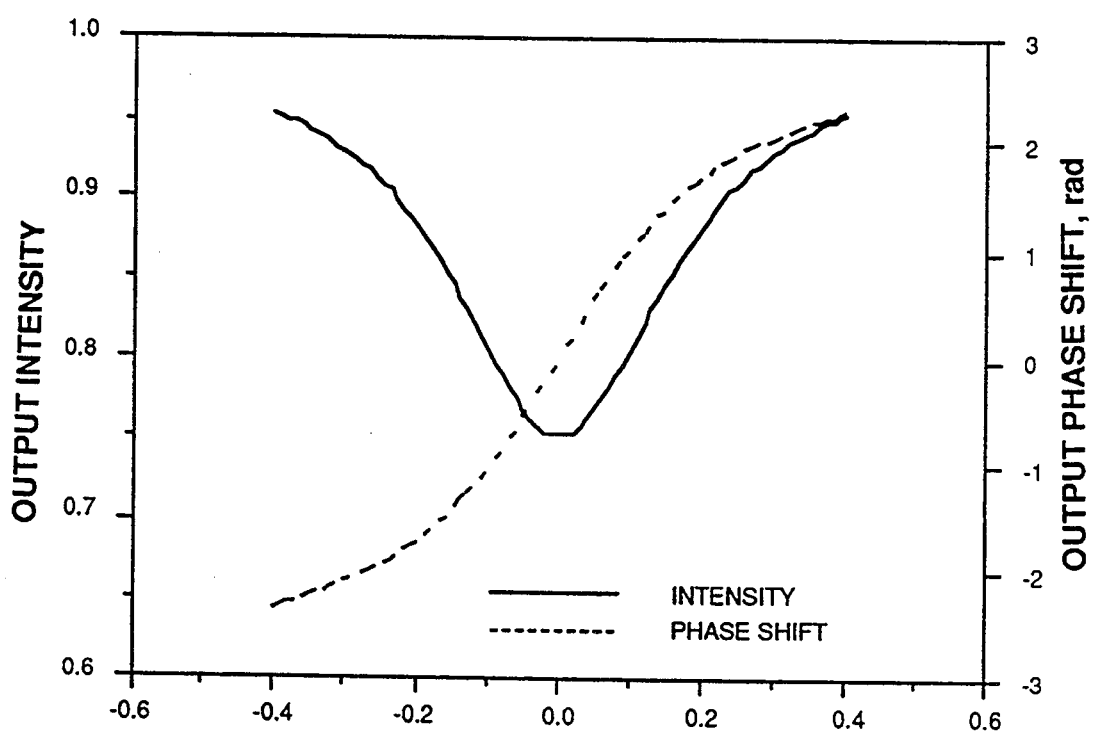
FIG. 2 is a graph of output phase dispersion and intensity variation versus the cavity detuning for a cavity with 85% input coupler reflectivity.

Shown in FIG. 2 is a plot of the reflected intensity and phase versus the cavity detuning $\phi$. When $\phi = 0$, the cavity is in resonance with the incoming signal. In this case the reflected signals is in phase with the incoming signal. When the cavity is slightly off resonance, however, the reflected signal experiences a phase shift which is highly dispersive near the cavity resonance. The reflected intensity also experiences variation as the cavity is tuned across resonance. Since the back mirror of the cavity has high reflectivity, most of the energy is reflected into the incident direction. When the cavity is off resonance, the reflected intensity is very close to the incident intensity. When the cavity is tuned near resonance, on the other hand, small absorption/scattering loss within the cavity can multiply as the number of passes through the cavity increases and result in a drop in the output intensity. This absorption dip is generally undesirable since it reduces the amount of output signal power. However, it can also be used to provide the error signal for locking the cavity near resonance with the incoming laser.

Figure 3:
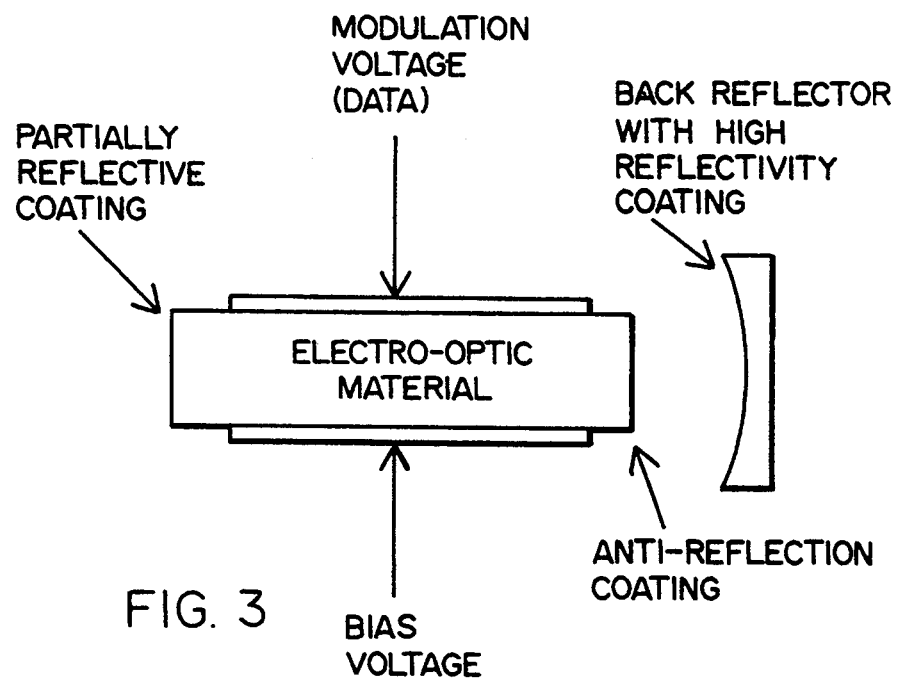
FIG. 3 is a generalized illustration of a phase modulator according to the present invention.

The large phase dispersion experienced by the Gire-Turnois etalon as it is tuned across its resonance can be used to modulate the phase of the reflected optical signal from the cavity if the effective cavity length can be modulated by an externally applied electrical signal. The resulting phase modulator is shown in FIG. 3 in which an electro-optic (EO) crystal is situated between the front and back surface of the etalon. The index of refraction and hence the optical path length through the EO crystal can be modulated by applying a voltage signal. The cavity is normally biased near its reflective resonance with the incoming laser light. A small voltage signal across the EO crystal will therefore result in a detuning angle $\phi$ which can be related to the applied voltage V and the half wave voltage $V_\pi$ of the EO crystal by $$\phi = 2\pi V/V_\pi. \quad (6)$$

The factor of two in Equation (6) is introduced since the optical signal traverses twice through the crystal per round trip for a linear cavity. The half wave voltage for a 3 m crystal cut for phase modulation is given by $$V_\pi = \frac{\lambda}{n^3 r_{33}} \frac{d}{l}, \quad (7)$$

where $\lambda$ is the wavelength, n is the index of refraction, $r_{33}$ is the electro-optic coefficient, d is the thickness of the crystal, and i is the length of the crystal.

Figure 4:
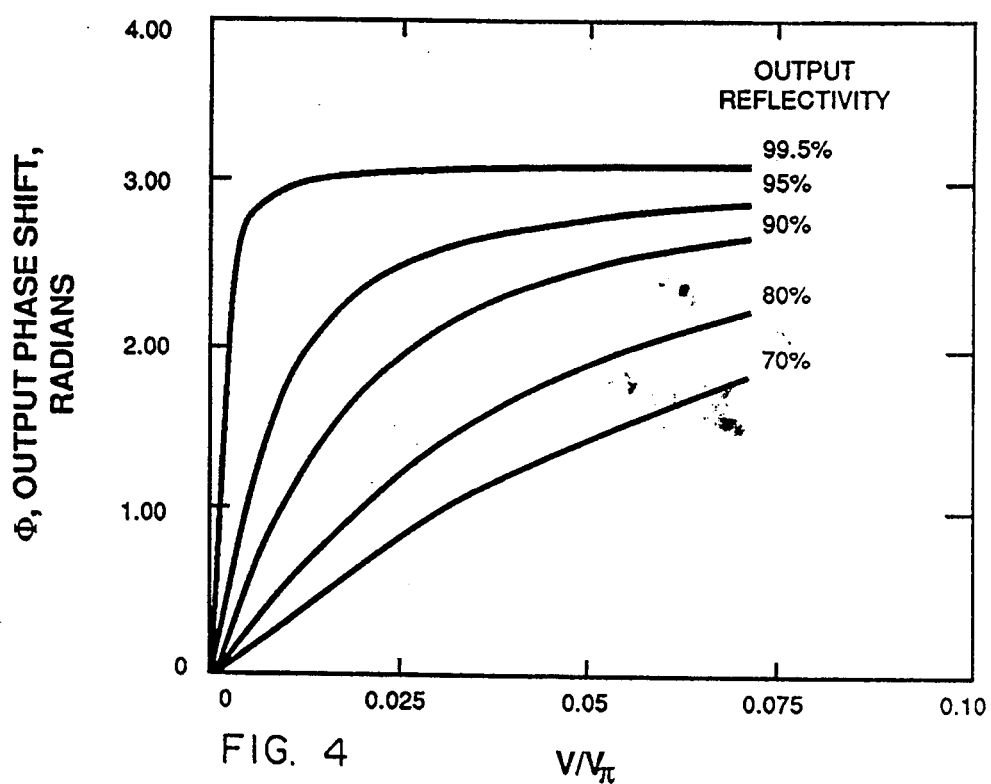
FIG. 4 is a graph of output phase versus applied modulation voltage for cavities with different values of input coupler reflectivity.

The steady-state phase shift performance of the modulator can be easily evaluated using Equation (5) and the results are plotted in FIG. 4 as a function of the input voltage for different values of mirror reflectivity. The plot is generated assuming zero intracavity loss (G=1). It is seen that the output phase shift per unit voltage input increases as the reflectivity increases. For a highly tuned cavity, only a small voltage needs to be applied to produce a large output phase shift. On the other hand, it can be seen from FIG. 4 that cavity with high reflectance input coupler is very sensitive to intracavity losses.

Figure 5:
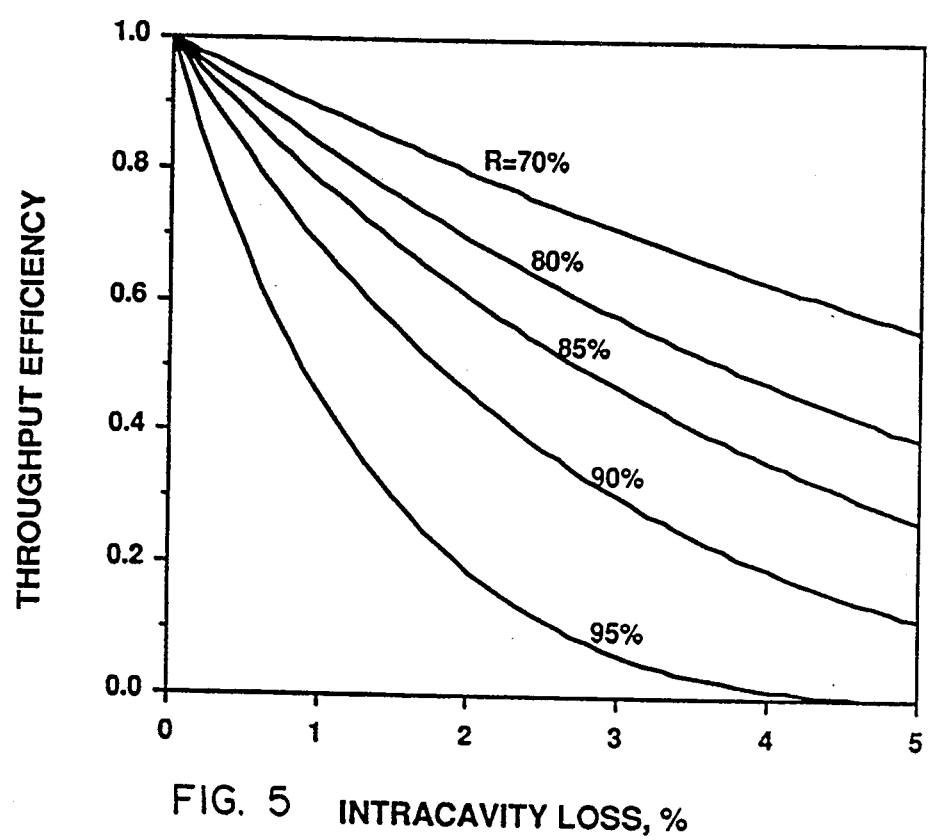
FIG. 5 is a graph of output intensity versus intracavity loss for a resonant cavity modulator with different values of input coupler reflectivity.

The dependence of the output intensity versus the intracavity loss $\rho = 1 - G$ is plotted in FIG. 5. It is seen that the output intensity is very sensitive to the intracavity loss when the cavity finesse is high. This is because for a high finesse cavity the optical signal traverses through the cavity many times. Consequently any loss within the cavity can result in a significant loss at the output. As the input coupler reflectivity and hence the finesse of the cavity decrease, the output intensity becomes less sensitive to the intracavity loss.

Figure 6:
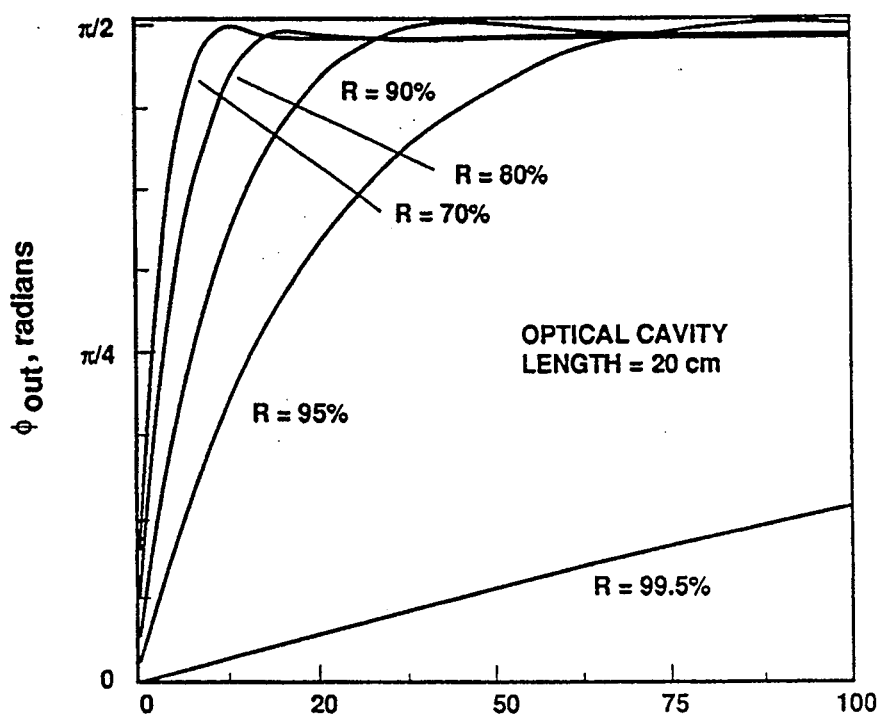
FIG. 6 is a graph of output phase shift versus time for a resonant cavity with different values of input coupler reflectivity.
Figure 7:
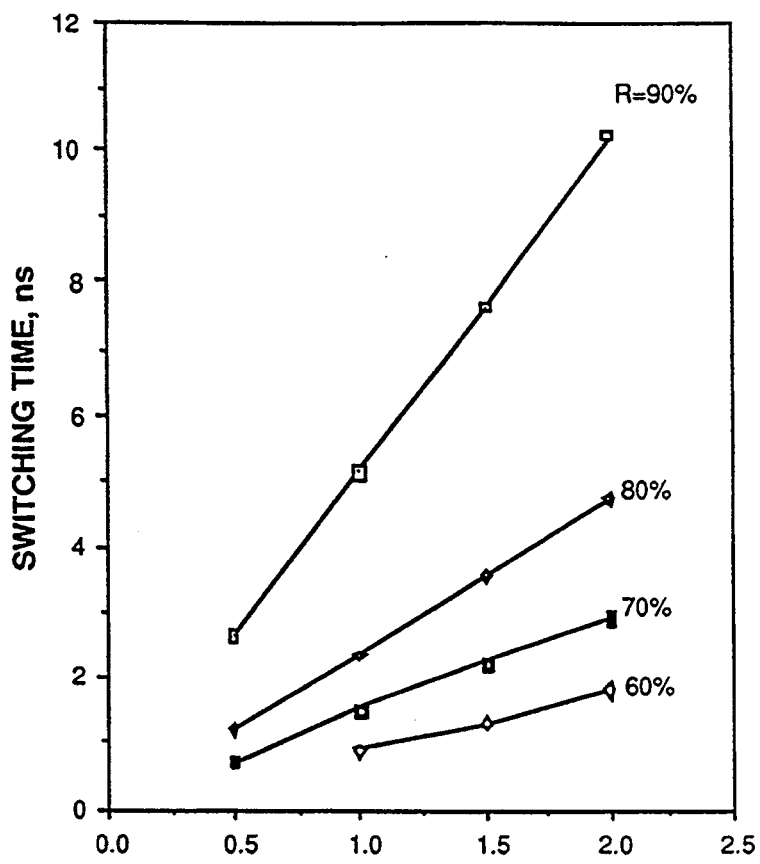
FIG. 7 is a graph of required switching time for the output phase to shift from $-\pi/2$ to $+\pi/2$ for a resonant cavity phase modulator with different values of input coupler reflectivity.

Transcient response to step switching voltage, on the other hand, cannot be predicted using Equation (5). Time domain response is in general a complicated function of the cavity finesse, the intracavity loss, and the cavity length; and cannot be expressed in a closed-form. In order to calculate the build-up of the resultant phase shift as a function of intracavity loss, output mirror reflectivity, applied voltage and time, a computer model of the phase modulator was developed to simulate the response. The phase shift after successive round trips in the modulator can be modeled as $$E_r(N) = tE_i + rgE_r(N-1)e^{i\phi(t)}$$

$$E_o(N) = -rE_i + tgE_r(N-1)e^{i\phi(t)} \quad (8)$$

where $E_r(N)$ and $E_o(N)$ are the amplitudes of the circulating and the output fields after the $N^{th}$ round trip, respectively. Both amplitude transmittance and reflectance have been modeled as real numbers. Any phase shift can be absorbed into the round trip phase shift, $\phi$. After each round trip, the circulating field experiences a net phase shift of $\phi$. After a sufficient number of iterations, the output phase shift converges to a value given by Equation (5). The resultant phase shift build-up, based on the simulations, is graphed in FIG. 6 as a function of time for different coupler reflectivities. In this simulation, the applied voltage has been modeled as a step function. As seen from FIG. 6, cavities with lower reflectivity mirrors have faster switching times. Shown in FIG. 7 is a plot of the switching time versus cavity length for several input coupler reflectivities. Again, it is seen that cavities with lower finesse have faster switching times.

In order to achieve a reasonable performance at 100 Mbps, it is desirable that the pulse rise time be shorter than 4 ns. Furthermore, since the complexity of constructing a high voltage driver increases rapidly with voltage requirements, it is desirable to limit the maximum amount of voltage applied to the modulator to less than 20 V. From previous analysis, it is known that there are design trade-offs between rise time and cavity finesse, and between required switching voltage and cavity finesse. A low finesse cavity generally has a faster switching time, but requires higher switching voltage. On the other hand, cavity finesse cannot be increased indefinitely as the switching time also increases with cavity finesse. Furthermore, there is a tradeoff between the half-wave voltage of the EO crystal with its aspect ratio, i.e., thin crystal has a lower half wave voltage, but is more difficult to align. Several point designs for the modulator using different values of input coupler reflectivity were evaluated. Shown in Table 1 are the resulting designs that satisfy the above stated performance requirements.

TABLE 1

| Input Coupler Reflectivity | Crystal/Cavity Length (mm) | Crystal Thickness (mm) | Switching Time (ns) | Voltage (V) | Max Intercavity Loss for 80% Thruput (%) |
|---|---|---|---|---|---|
| 90% | 5.0/7.0 | 1.0 | 3.1 | 10 | 0.5 |
| 85% | 10.0/12.0 | 1.0 | 3.4 | 10 | 0.9 |
| 80% | 15.0/17.0 | 1.5 | 3.7 | 11 | 1.2 |
| 70% | 25.0/27.0 | 2.0 | 3.8 | 14 | 2.0 |

Among them, the 90% reflectance design requires an intracavity loss less than 0.5% which is difficult to achieve. Cavity design using reflectivities less than 80% require EO crystals with high aspect ratio. These designs are undesirable since they are difficult to align. The 85% reflectance design was selected based on the ease of alignment, short rise time, and its tolerance to intracavity losses.

From FIG. 2, it is seen that the strong phase dispersion occurs only when the cavity is biased on resonance. A cavity biased away from resonance will have little or no response to the modulation voltage. Consequently, in order for the external cavity to exhibit a strong phase modulation characteristics, the cavity must be maintained on resonance with the incoming laser signal.

Figure 9:
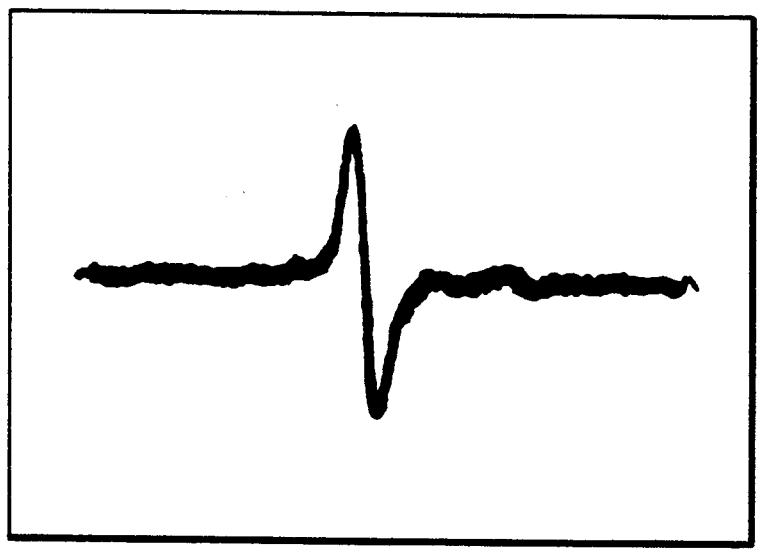
FIG. 9 is a display image of a typical error curve for the resonant cavity modulator driven by a pseudo-random data sequence wherein the horizontal axis represents the cavity detuning.
Figure 8A:
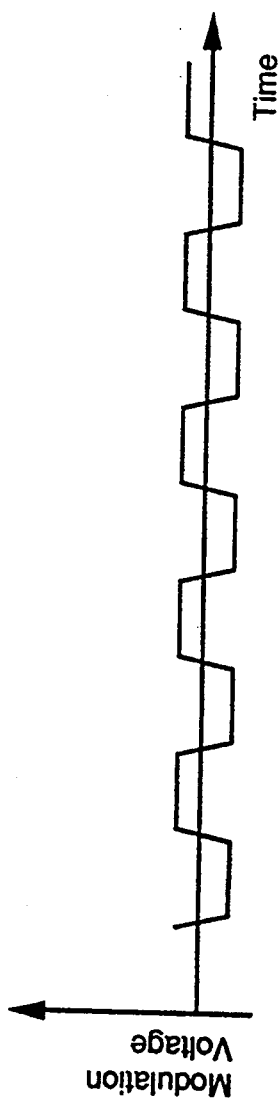
Figure 8B:
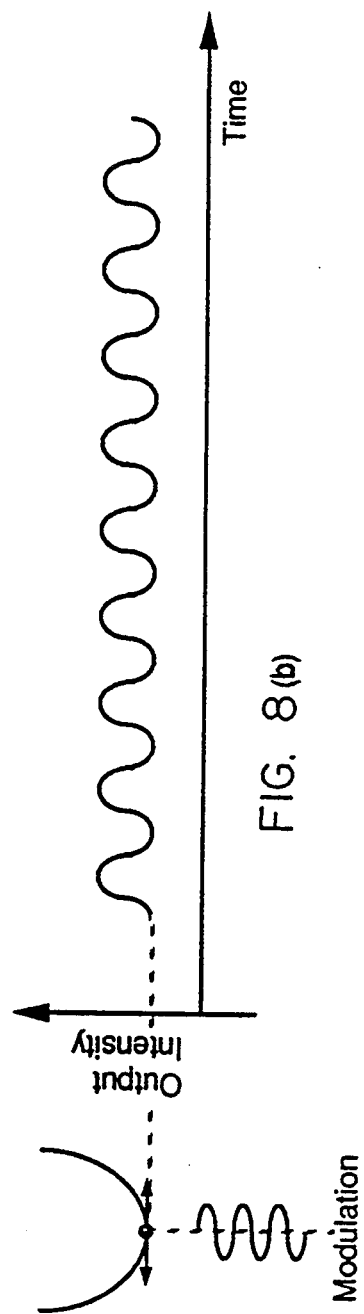
Figure 8A:
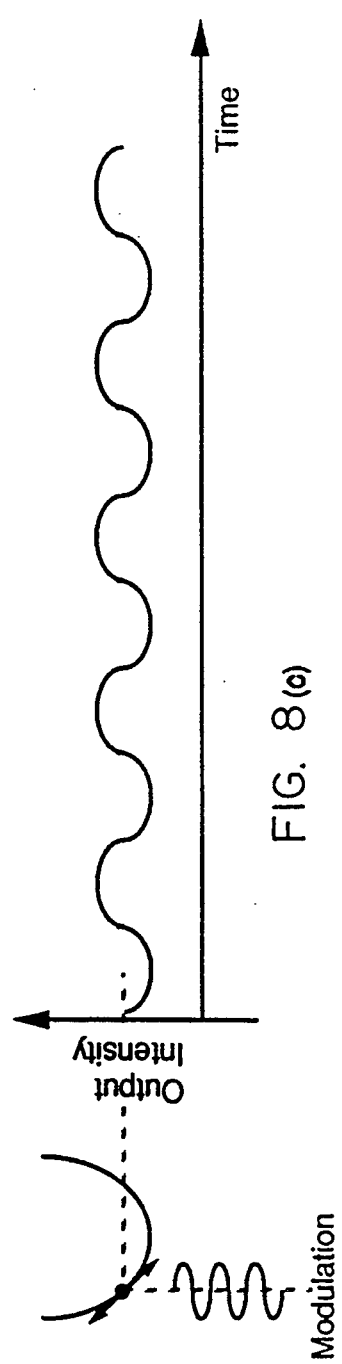
Figure 8D:
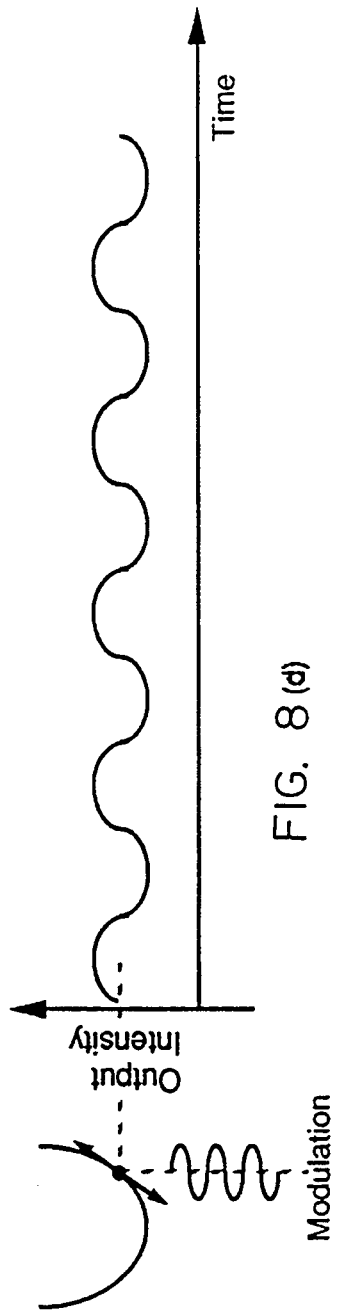

Cavity stabilization can be accomplished using a variety of different means. For the 100 Mbps modulator, cavity stabilization is achieved by monitoring the drop off of output intensity due to absorption of signal near resonance. The principle is illustrated in FIG. 8 where the output intensity is plotted against the cavity detuning for cavities biased on resonance and at either side of the resonance. Shown in the left-hand side of FIGS. 8(b)-(d) is the output intensity versus cavity detuning, which is being modulated by a periodic sequence shown in FIG. 8(a). When the cavity is biased on resonance, the symmetric displacement at both sides of the absorption dip result in an output intensity modulation that is at twice the frequency of the modulation signal. When the cavity is biased away from resonance, however, the modulation result in asymmetric displacement around the absorption dip. In this case the output intensity exhibits a frequency component at the modulation frequency. Depending on the direction of cavity detuning, this intensity fluctuation signal can be either in-phase or 180 degrees out of phase with the modulation voltage. By correlating the output intensity with the driving signal, therefore, an error voltage can be derived for maintaining the cavity on resonance. Shown in FIG. 9 is the error signal as the cavity is swept across its resonance. Notice the strong locking signal near the cavity resonance.

Although the locking technique was described using a periodic modulation signal, it is straightforward to show that the correlation characteristics and hence the error signal remains identical for nonperiodic input signals. As a result, the random data stream for the communication channel can be used to provide the necessary dither to the cavity and hence maintain the cavity on resonance with the incoming laser signal. In practice, instead of monitoring the output intensity directly, the cavity can be stabilized by sensing the small leakage of signal from the backside of the high reflectance mirror.

Figure 10:
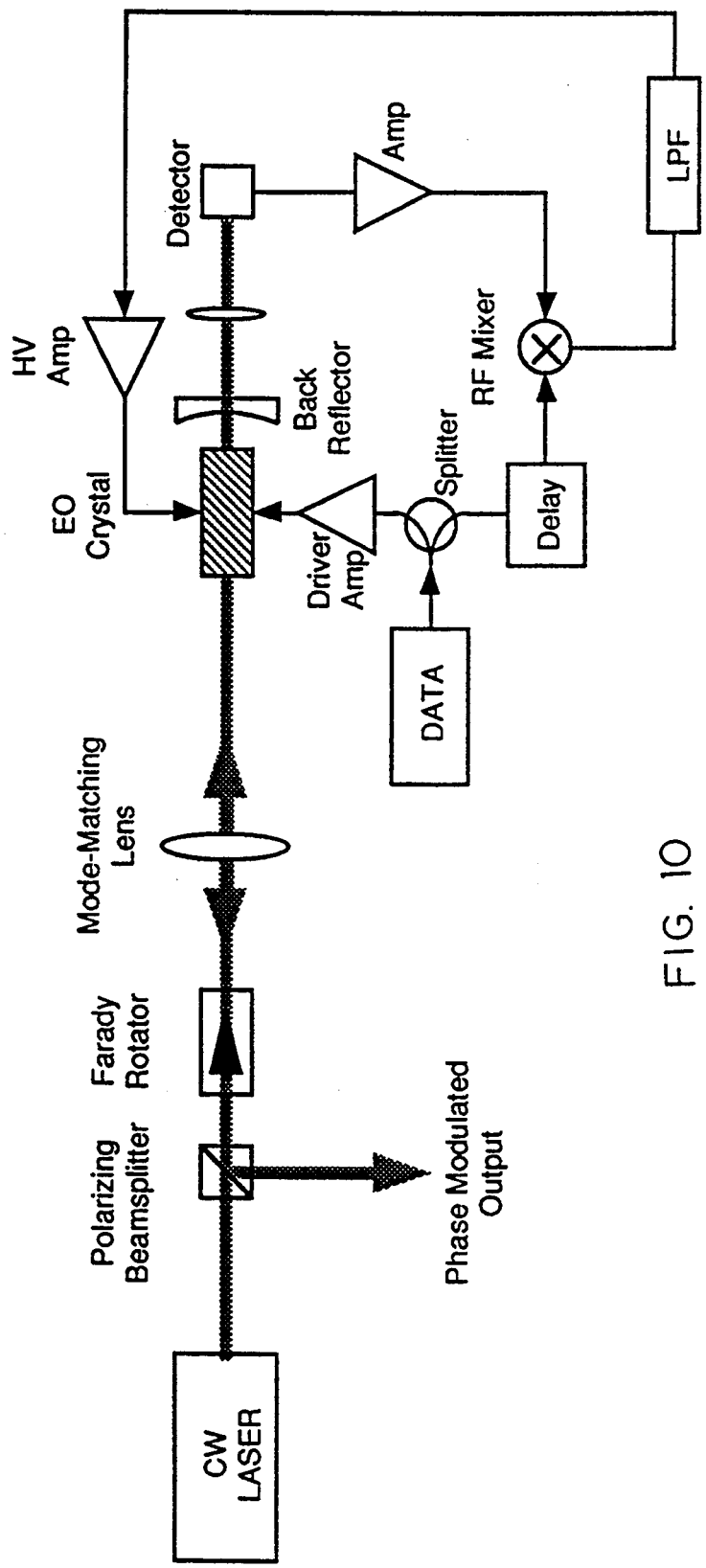
FIG. 10 is a block diagram of an experimental configuration of the present invention.

Shown in FIG. 10 is a block diagram of a tested configuration. The resonant cavity consists of a 1 cm-long EO crystal and a high reflectance (HR) back mirror. One side of the EO crystal is coated with a 85% reflective coating, and used as the input coupler to the resonant cavity. The second side of the EO crystal is antireflection coated to reduce intracavity loss. The HR back mirror has a 20 cm radius of curvature. The long radius of curvature is chosen to reduce the sensitivity to mode matching optics. A 2 mm air gap between the EO crystal and the back mirror results in an effective cavity length of 12 mm.

A 10 cm focal length lens is used to mode match the output signal from a Lightwave Model 120-01A laser into the modulation cavity. Since the input and output beams are collinear, a two-stage Faraday isolator is used to separate the two beams.

A focusing lens and a photodetector positioned at the back of the HR mirror senses the small leakage signal for cavity stabilization purposes. This signal is subsequently amplified and mixed with a properly delayed version of the modulation data stream using an RF mixer. The delay between two arms is adjusted such that the same error curve shown in FIG. 9 is obtained at different modulation frequencies. The output of the mixer is then filtered using a low pass integrator and the output of the integrator is fed into a high voltage amplifier to bias the EO crystal.

The phase shifted output is examined using an optical heterodyne receiver. The amplitude of the detected IF signal is proportional to that of the input optical signal. The amount of phase shift as a function of the input voltage can be measured by applying a sinusoidal modulation voltage and observing the resulting IF spectrum. If the phase modulator responds linearly with modulation voltage, the resulting phase modulated IF signal can be decomposed into a sum of pure sinusoids at difference harmonics as $$\sin(\omega t + \Phi \sin \omega_m t) = \qquad (9)$$

$$\sum_{n=0}^{\infty} J_n(\Phi)\sin(\omega + n\omega_m)t + \sum_{n=1}^{\infty} J_n(\Phi)\sin(\omega - n\omega_m)t,$$

where $\omega$ and $\omega_m$ are the IF carrier and modulation frequencies, respectively, $J_n(\Phi)$ is the $n^{th}$ order Bessel function, and $\Phi$ is the modulation index of the phase modulated signal. From Equation (9), it is seen that the amount of IF signal power falls within the $k^{th}$ sideband is proportional to $J_n^2(\Phi)$. Experimentally, the phase modulation index can be determined by measuring the sideband powers, then adjusting the parameter $\Phi$ until an optimal fit was obtained between the predicted sideband powers and the experimentally measured results. One method of fitting the data is to minimize the mean square error given by $$E_D(\Phi) = \sum_{n=1}^{k} \left[ 10\log\left(\frac{J_n(\Phi)}{J_0(\Phi)}\right)^2 - (P_n - P_0) \right], \qquad (10)$$

where we have denoted the measured power within the $n^{th}$ sideband by $P_n$. The measured sideband powers are normalized with respect to the carrier power. This allows us to deduce the phase shift without an absolute power measurement.

Figure 11A:
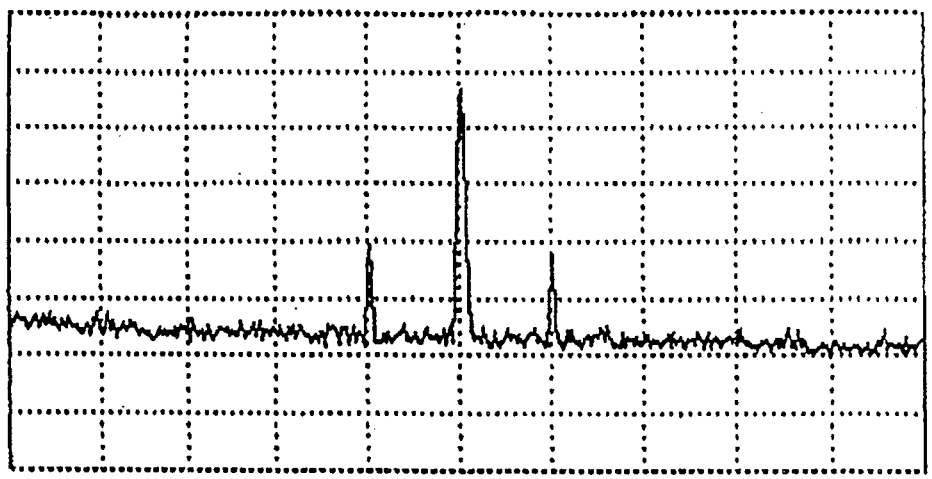
FIGS. 11(a), 11(b) and 11(c) is the observed IF spectrum of the resonant cavity phase modulator when driven by a 0.2 Volt sinusoid, a 5.5 Volt sinusoid and a 10 Volt amplitude pseudo-random data sequence.
Figure 11B:
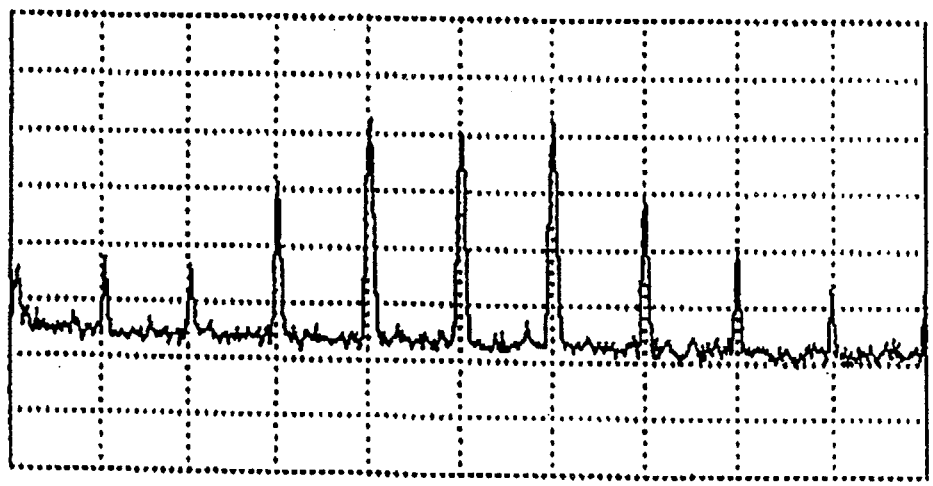
Figure 11C:
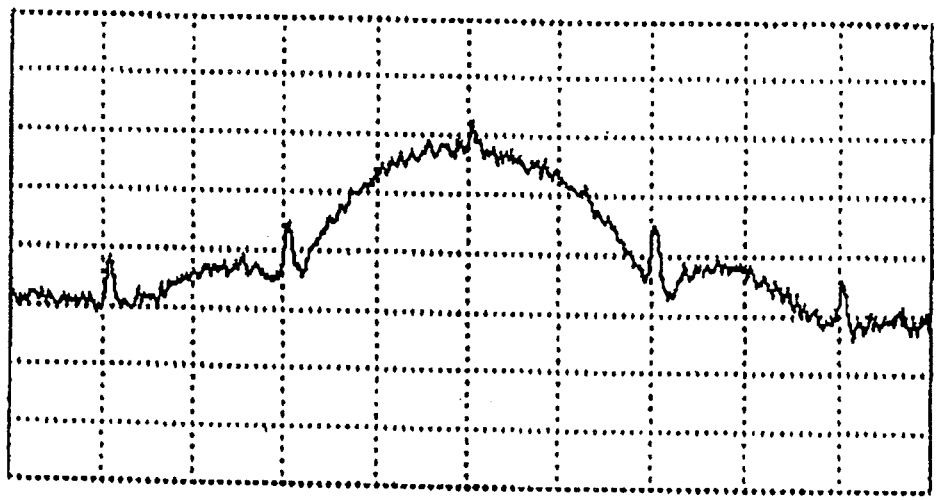

In principle, the method outlined in Equations (9) and (10) is more accurate when more sidebands are measured. Unfortunately, this is true only when the modulator has a linear response and infinite bandwidth. The resonant cavity phase modulator, however, has an inherent bandwidth constraint. Furthermore, the intracavity loss introduces an amplitude modulation that also modifies the IF spectrum. Equation (10) must therefore be properly modified in order to estimate the amount of phase shift for the resonant cavity modulator. This is accomplished using the computer simulation model given in Equation (8). The simulated response of the phase modulator with respect to sinusoidal modulation voltage is Fourier transformed to generate the predicted sideband powers. These sideband powers are then correlated with the measured sideband powers to derive the estimated phase shift performance. Shown in FIGS. 11(a) and 11(b) are the resulting IF spectrum for phase modulation of 0.2 rad and 1.6 rad, respectively. Note that the carrier power is suppressed at large modulation index as expected. Also shown in FIG. 11(c) is the IF spectrum when the modulator is driven by a 23 bit pseudo random data sequence at modulation voltage of 10 V. Note the near complete suppression of the IF carrier as expected.

It will now be understood that what has been disclosed herein comprises an external resonant cavity phase modulator for coherent electro-optic devices such as CW lasers. Phase modulation of a laser output beam at extremely high data rates (i.e., 100 Mbps) and with relatively low voltage (i.e., 10 Volts) is demonstrated. A feedback system is used to correlate the modulated light and the modulating voltage to lock the cavity to the resonance of the laser output by appropriately biasing the electro-optic crystal of the modulator.

Having thus described an exemplary embodiment of the invention, what is claimed is:

1. A resonant cavity electro-optic phase modulator for coherent optical communications, the modulator comprising:

an elongated electro-optic crystal for receiving a beam of coherent light, said crystal having an input end and an output end;

a mirror positioned near the output end of said crystal for reflecting coherent light traveling through said crystal;

means at said input end of said crystal for coupling said coherent light into said crystal;

means for applying a voltage across said crystal for modulating the index of refraction of said crystal and thus the phase of said coherent light; and means for applying a bias voltage to said crystal for maintaining said cavity on resonance with said beam of coherent light.

2. The phase modulator recited in claim 1 wherein said coupling means comprises a reflective coating on said input end of said crystal.

3. The phase modulator recited in claim 1 wherein said mirror and said crystal are spaced apart by an air gap.

4. The phase modulator recited in claim 1 wherein said voltage applying means generates pulses at a frequency of at least 100 Mbps, 5. The phase modulator recited in claim 1 further comprising a mode-matching lens positioned in front of the input end of said crystal, 6. The phase modulator recited in claim 1 further comprising a Faraday isolator positioned in front of the input end of said crystal.

7. The phase modulator recited in claim 1 wherein said bias voltage applying means comprises electrical feedback means for correlating optical intensity fluctuation at said output end of said crystal with said modulating voltage.

8. The phase modulator recited in claim 1 wherein said voltage applying means modulates said crystal with a pseudo-random data sequence.

9. The phase modulator recited in claim 8 wherein said data sequence includes pulses at a frequency of at least 100 Mbps.

10. An external phase modulator for use with a laser; the modulator comprising:

a crystal responsive to applied voltage for varying refractive index at the frequency of said laser;

means for coupling a portion of the output of said laser into said crystal;

means for reflecting said portion of said laser output after said portion travels through said crystal;

a pulse generator for applying said voltage to said crystal for phase modulating said portion of said laser output; and means for locking said modulator on resonance with said laser.

11. The phase modulator recited in claim 10 wherein said coupling means comprises a reflective coating on the input end of said crystal.

12. The phase modulator recited in claim 10 wherein said pulse generator generates pulses at a frequency of at least 100 Mbps.

13. The phase modulator recited in claim 10 wherein said crystal is biased at resonance with said laser by feedback means for correlating the output light intensity fluctuations of said crystal with the output of said pulse generator.

14. The phase modulator recited in claim 13 wherein said reflecting means passes a small fraction of said laser output portion; said feedback means comprising a detector positioned for detecting said small fractions, an RF mixer for comparing said detected small fraction with a delayed version of said pulse generator output, and means for generating a biasing voltage dependent upon the output of said RF mixer.

15. The phase modulator recited in claim 10 wherein said crystal comprises an input end and an output end, wherein said coupling means comprises a partially reflective coating on said input end and wherein said reflecting means comprises a reflector positioned in alignment with and external to the output end of said crystal.

16. The phase modulator recited in claim 10 wherein said pulse generator produces a pseudo-random data sequence.

* * * * *